United States Patent
Li

(10) Patent No.: US 10,612,194 B2
(45) Date of Patent: Apr. 7, 2020

(54) GYPSUM WALLBOARD COMPRISING LAMINATED MULTI-PLY PAPER COVER SHEETS BONDED WITH A NON-IONIC POLYMERIC BINDER AND METHODS

(71) Applicant: United States Gypsum Company, Chicago, IL (US)

(72) Inventor: Alfred Li, Naperville, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 260 days.

(21) Appl. No.: 15/607,871

(22) Filed: May 30, 2017

(65) Prior Publication Data

US 2018/0010301 A1 Jan. 11, 2018

Related U.S. Application Data

(60) Provisional application No. 62/358,938, filed on Jul. 6, 2016.

(51) Int. Cl.

| | |
|---|---|
| D21H 27/22 | (2006.01) |
| B32B 13/08 | (2006.01) |
| B32B 7/04 | (2019.01) |
| B32B 13/00 | (2006.01) |
| B32B 13/04 | (2006.01) |
| B32B 27/30 | (2006.01) |
| B32B 27/08 | (2006.01) |
| B32B 29/00 | (2006.01) |
| B05D 1/12 | (2006.01) |
| B32B 29/06 | (2006.01) |
| D21H 11/14 | (2006.01) |

(52) U.S. Cl.
CPC ............... *D21H 27/22* (2013.01); *B05D 1/12* (2013.01); *B32B 7/04* (2013.01); *B32B 13/00* (2013.01); *B32B 13/04* (2013.01); *B32B 13/08* (2013.01); *B32B 27/08* (2013.01); *B32B 27/306* (2013.01); *B32B 29/00* (2013.01); *B32B 29/06* (2013.01); *D21H 11/14* (2013.01); *B32B 2250/03* (2013.01); *B32B 2255/12* (2013.01); *B32B 2255/20* (2013.01); *B32B 2255/26* (2013.01); *B32B 2307/3065* (2013.01); *B32B 2307/546* (2013.01); *B32B 2307/712* (2013.01); *B32B 2307/7145* (2013.01); *B32B 2307/726* (2013.01); *B32B 2329/04* (2013.01); *B32B 2419/00* (2013.01); *B32B 2607/00* (2013.01)

(58) Field of Classification Search
CPC ..................................................... B32B 13/08
USPC .......................................................... 156/44
See application file for complete search history.

(56) References Cited

U.S. PATENT DOCUMENTS

| | | | |
|---|---|---|---|
| 2,806,811 A | 9/1957 | Von Hazmburg | |
| 3,112,235 A * | 11/1963 | Blanchard .................. | C09J 5/04 156/310 |
| 4,372,814 A * | 2/1983 | Johnstone .............. | D21H 11/04 162/124 |
| 4,518,652 A | 5/1985 | Willoughby | |
| 4,959,272 A | 9/1990 | Long | |
| 5,057,570 A * | 10/1991 | Miller .................... | D21H 17/00 524/425 |
| 2005/0103456 A1 | 5/2005 | Hein et al. | |
| 2006/0037724 A1 | 2/2006 | Akai et al. | |
| 2006/0134445 A1 | 6/2006 | Hedrick et al. | |
| 2011/0008631 A1 | 1/2011 | Lindqvist | |
| 2012/0167805 A1 | 7/2012 | Wittbold et al. | |
| 2014/0284011 A1 | 9/2014 | Krapsch et al. | |

FOREIGN PATENT DOCUMENTS

| | | |
|---|---|---|
| EP | 0258064 | 3/1988 |
| GB | 1037351 | 7/1966 |
| GB | 1381457 | 1/1975 |

* cited by examiner

*Primary Examiner* — Scott W Dodds
(74) *Attorney, Agent, or Firm* — Greer, Burns & Crain, Ltd.

(57) ABSTRACT

Provided are wallboard panels comprising laminated multi-ply paper cover sheets bonded with a non-ionic polymeric binder and a cross-linker, and methods for making the wallboard panels.

7 Claims, No Drawings

GYPSUM WALLBOARD COMPRISING LAMINATED MULTI-PLY PAPER COVER SHEETS BONDED WITH A NON-IONIC POLYMERIC BINDER AND METHODS

CROSS-REFERENCE TO RELATED APPLICATIONS

This application claims a benefit of priority to U.S. Provisional Patent Application 62/358,938 filed Jul. 6, 2016, the entire disclosure of which is incorporated herein by reference.

TECHNICAL FIELD

This invention provides gypsum wallboard prepared with laminated multi-ply paper cover sheets in which paper plies are boned together with a non-ionic polymeric binder and a cross-linker.

BACKGROUND

Various gypsum products, including wall panels, ceiling panels and tiles, are commonly used in the construction industry. Many of these gypsum products are made by preparing an aqueous gypsum slurry with calcined gypsum (calcium sulfate alpha hemihydrate, calcium sulfate beta hemihydrate and/or calcium sulfate anhydrate), shaping the slurry and then allowing the slurry to harden as calcined gypsum rehydrates into gypsum (calcium sulfate dihydrate). A gypsum board composite, known as wallboard, can be manufactured by sandwiching a gypsum slurry between two paper cover sheets.

As described in detail in U.S. Pat. No. 4,959,272, the entire disclosure of which is incorporated herein by reference, paper for a wallboard cover sheet is conventionally made by pulping up with water various cellulosic fiber materials which may comprise waste paper including old corrugated paper, kraft cuttings and waste newspaper. This paper-water stock is then formed into paper plies by draining water on several continuously moving wire cylinders. In order to make a multi-ply paper, separate paper plies are superimposed and joined together by a carrying felt. The weak paper web is then dewatered in a press section where water is pressed out of the web. The pressed paper is dried in a multi-cylinder drying section with steam added to each cylinder. The dried paper is subjected to a squeezing or calendaring operation for uniformity in thickness and is then finally rolled into rolls. This paper is subsequently utilized as paper cover sheets to form gypsum wallboard by depositing a calcined gypsum slurry between two sheets, and permitting the gypsum to set and dry.

Typically, two different paper cover sheets are used. One paper cover sheet is used for the back side of the wallboard. This paper cover sheet is referred to as the backer paper sheet. Another paper cover sheet is used for the face side of the wallboard which will be visible and decorated after the wallboard installation. This paper cover sheet is referred to as the facer paper sheet.

A multi-ply paper cover sheet may comprise different plies. Several filler plies, typically from 2 to 5, are prepared of a hard stock nature such as for example, kraft and boxboard cuttings. The set of filler plies may then be overlaid with 1 to 2 top liner plies, also referred to as liner or outer plies. Typically, a liner ply consists mainly of flyleaf shavings and newspaper of a soft ground wood quality with shorter fibers. A wallboard is covered with a laminated multi-ply paper cover sheets. Typically, paper plies are adhered to each other by being superimposed over each other right after the ply formation and subsequent pressing.

In wallboard, paper cover sheets are contributing to the nail pull strength, flexural strength, and water and mold resistance. Studies have also revealed that the tensile strength of a paper cover sheet can influence the fire performance of gypsum fire-rated products.

Efforts have been made to prevent separation of paper plies from each other in a laminated multi-ply paper cover sheet as well as from splitting a paper ply directly adjacent to a gypsum core. As provided in U.S. Pat. No. 2,806,811, a resinous additive can be added to a paper pulp during making a paper ply as furnish. This method is also referred to as internal addition because the additive with very low usage is mixed directly with pulp during formation of a paper ply so as to minimize the white water chemistry change. However, improving the paper tensile strength continues to be a subject of ongoing research in the paper industry.

SUMMARY

This disclosure provides a method for preparing wallboard with improved tensile strength in which paper plies of a multi-ply paper cover sheet are bonded together with a non-ionic polymeric binder cross-linked with boric acid. The method comprises the following steps:
- forming paper plies from paper pulp;
- spraying paper plies with PVOH (polyvinyl alcohol);
- spraying paper plies with boric acid solution;
- superimposing paper plies to form a multi-ply paper sheet bonded with a non-ionic polymeric binder;
- pressing and drying the multi-ply paper sheet;
- preparing a gypsum slurry;
- depositing the gypsum slurry between two paper sheets, at least one of which is the multi-ply paper sheet; and
- forming a wallboard panel.

In some embodiments, the multi-ply paper sheet comprises at least one filler ply and at least one liner ply. PVOH and boric acid may be sprayed between at least one of the following plies: between two filler plies, between a filler ply and a liner ply, and between two liner plies. In addition to crosslinking, boric acid also provides as a biocidal treatment.

In further embodiments, PVOH is applied to the surface of a first ply, while boric acid is applied to the surface of a second ply, the first ply and the second ply are then superimposed such that the surface treated with PVOH comes in contact with the surface treated with boric acid. A PVOH polymer may be a polymer with ultra-low degree of polymerization, a polymer with low degree of polymerization, or a combination thereof. The paper pulp may comprise recycled paper waste, including recycled paper waste consisting of kraft, boxboard cuttings, flyleaf shavings and/or newspaper.

PVOH can be applied as a water-based solution with a concentration in the range from 1% to 10% by weight. Boric acid can be applied as a water-based solution with a concentration in the range from 1% to 10% by weight.

The invention also pertains to a wallboard obtained by this method.

A wallboard comprises a gypsum core disposed between two paper cover sheets, the first paper cover sheet being a facer and the second paper cover sheet being a backer, wherein both paper cover sheets are multi-ply paper cover sheets and wherein at least two plies in each of the two paper cover sheets are bonded together with a non-ionic polymeric binder cross-linked with boric acid, wherein the non-ionic polymeric binder is PVOH polymer or co-polymer. PVOH may be selected from PVOH polymers with the average molecular weight in the range from 12,000 to 200,000, and in particular in the range from 12,000 to 50,000. PVOH is hydrolyzed 70-100 ml %, and in particular PVOH is hydrolyzed 95-100 ml %. Suitable PVOH polymer includes a polymer with ultra-low and low degree of polymerization.

The facer paper cover sheet in the wallboard may comprise from 2 to 5 filler plies overlaid with 1 to 2 liner plies, and the facer paper cover sheet and the backer paper cover sheet may comprise recited waste paper.

Further embodiments provide a method for making a wallboard panel in which the following steps are performed:
 forming paper plies from paper pulp;
 applying a solution of PVOH and boric acid between plies;
 superimposing paper plies to form a multi-ply paper sheet bonded with a non-ionic polymeric binder;
 pressing and drying the multi-ply paper sheet;
 preparing a gypsum slurry;
 depositing the gypsum slurry between two paper sheets, at least one of which is the multi-ply paper sheet; and
 forming the wallboard panel.

DETAILED DESCRIPTION

The present invention provides gypsum products, including a gypsum wallboard, with improved tensile strength and fire resistance. Methods for obtaining such products are provided as well.

Disclosed is a method in which a nonionic strength enhancing polymer and a cross-linker are applied directly on the surface of a paper ply immediately before paper plies are superimposed during formation of a multi-ply paper sheet.

Various nonionic strength enhancing polymers are suitable, including polyvinyl alcohol (PVOH) polymer and polyvinyl alcohol derivatives. Polyvinyl alcohol (PVOH) is a polymer comprising vinyl alcohol monomers and/or derivatives thereof linked together into a polymeric structure. PVOH can be a homopolymer or a co-polymer. Some co-polymers may comprise monomers selected from ethylene, methyl acrylate and carboxylic acid. Suitable PVOH polymers may include those with ultra-low degree of polymerization (150-300), low degree of polymerization (350-650), medium degree of polymerization (1000-1500) and high degree of polymerization (1600-2200). Some of the provided methods employ PVOH with either ultra-low degree of polymerization or low degree of polymerization, or both.

PVOH can be obtained by hydrolyzing polyvinyl acetate to polyvinyl alcohol. Suitable PVOH includes a formulation which is partially or fully hydrolyzed. PVOH may be at least 60 mol % hydrolyzed, at least 70 mol % hydrolyzed, at least 80 mol % hydrolyzed, at least 90 mol % hydrolyzed. In some embodiments, PVOH is 70-100 mol % hydrolyzed. In further embodiments, PVOH is 95-100 mol % hydrolyzed.

Various grades of PVOH having different molecular weights are suitable. In some embodiments, PVOH with an average molecular weight in the range from 12,000 to 200,000 is suitable. Preferably, PVOH is a polymer of low molecular weight with an average molecular weight in the range from 12,000 to 50,000. Suitable nonionic strength enhancing polymers include various PVOH polymers available under the trade name SELVOL™ available from Sekisui Chemical Co. Ltd.

The nonionic strength enhancing polymer is used in combination with a cross-linker which facilitates the curing of the nonionic strength enhancing polymer after the nonionic strength enhancing polymer has been applied over a surface of a paper ply. Suitable cross-linkers include boric acid, also known as hydrogen borate, boracic acid, and orthoboric acid, with chemical formula $H_3BO_3$.

In some embodiments, a multi-ply paper cover sheet is prepared by obtaining several paper plies from pulped cellulosic fibers which may comprise up to 100% of recycled paper waste. The surface of plies is then treated with a PVOH solution. The PVOH treatment may comprise spraying at least one surface of a paper ply with a PVOH solution. In alternative, a PVOH solution may be rolled over a paper ply. Yet in other variations of the method, a paper ply can be briefly immersed in a PVOH solution. A PVOH solution can be used in various concentrations, including from 1% to 25% solution by weight. Immediately after treatment with a PVOH solution, the paper ply surface is treated with a boric acid solution. The treatment may comprise spraying and/or briefly immersing the paper ply surface into a boric acid solution.

A boric acid solution can be used in various concentrations, including from 1% to 25% solution by weight. Immediately, after the treatment with a boric acid solution, the paper ply is overlaid with another paper ply. Thus, the two paper plies are bonded together with PVOH cross-linked with boric acid.

In the present method, applying boric acid to paper plies also provides a biocidal treatment to paper plies. This improves resistance of a paper cover sheet against fungal and/or microbial growth and may also deter insects. Furthermore, the use of boric acid in the present method may decrease or eliminate the need for application of additional biocides during a gypsum board making process.

In some embodiments of the method, a surface of one paper ply is treated with a PVOH solution, while a surface of another paper ply is treated with a boric acid solution. The two surfaces are then immediately brought in contact during formation of a multi-ply paper sheet, and the two paper plies are bonded together with a PVOH adhesive which is cross-linked with boric acid.

Is some embodiments, each of the plies in a multi-ply paper cover sheet is bonded with a PVOH adhesive cross-linked with boric acid. For example, if this multi-ply paper sheet comprises 5 filler plies and 2 liner plies, each of the filler and liner plies is bonded to an overlaying ply with a PVOH adhesive cross-linked with boric acid. In other embodiments, only a liner ply is bonded to a filler ply with a PVOH adhesive cross-linked with boric acid. In further embodiments, each of the liner ply is bonded with another liner ply by a PVOH adhesive cross-linked with boric acid. In further embodiments only filler plies are bonded with a PVOH adhesive cross-linked with boric acid. Yet in further embodiments, filler plies are bonded together and to a liner ply with a PVOH adhesive cross-linked with boric acid.

Further embodiments of the method include those in which a first ply is treated with PVOH and a second ply is treated with boric acid. A paper sheet is then assembled by overlaying the first ply with the second ply and then overlaying the second ply with a third ply also treated with PVOH. Thus, the paper sheet is assembled by alternating plies treated with PVOH or boric acid.

In yet further embodiments, a solution of PVOH and boric acid is prepared and applied between plies.

Several technical advantages have been achieved by practicing a method of bonding plies in a multi-ply paper cover sheet in comparison to other methods in which various paper plies are bonded to each other simply by being pressed together.

Such technical advantages include improved tensile strength, anti-microbial resistance and porosity. Unexpectedly, these technical advantages have been achieved without a significant increase in paper weight, which is important because wallboard is preferably light for easy transportation and installation.

A person of skill will readily appreciate that the tensile strength of a multi-ply paper cover sheet is the maximum amount of tensile stress that the paper cover sheet can be exposed to before plies separate from each other.

The tensile strength can be measured in a tensile testing machine by a method as provided by the TAPPI Quality and Standard Department in its standard T 494 om-13 entitled as "Tensile properties of paper and paperboard."

A person of skill will also readily appreciate that paper caliper refers to the thickness of a sheet of paper expressed in thousandth of an inch. This measurement is taken with a micro meter. The greater the caliper value is, the greater the paper weight is.

Paper porosity is measured using Technidyne Porosity Tester (New Albany, Ind.). This instrument measures the time it takes in seconds for 100 cc of air passing through the paper. This method assesses the resistance of paper to the passage of air. The shorter the time is, the more porous the material is.

As shown in Table 1 below, the tensile strength, porosity and caliper values were measured for a multi-ply paper samples in which two plies were bonded together with PVOH cross-linked with boric acid. See samples A, B, C and D. The values were compared to those obtained for a multi-ply control paper in which two plies were simply superimposed and then pressed into a paper sheet. See control sample in Table 1.

As can be seen from Table 1, a significant increase in the tensile strength is observed for samples bonded with PVOH cross-linked with boric acid. A significant decrease in porosity time is observed for these samples in comparison to a control sample. Surprisingly, these results were obtained without an increase in paper weight, as can be seen from comparing the caliper value of the control sample to the caliper values of samples in which plies are bonded with PVOH cross-linked with boric acid.

Further embodiments provide methods by which a wallboard is obtained with the improved tensile strength and porosity. In these methods, a multi-ply paper sheet is produced by bonding paper plies during paper formation with PVOH cross-linked with boric acid. The multi-ply paper sheet is then used as at least one cover sheet for making a gypsum panel. In some embodiments, only the facer cover sheet is obtained by bonding at least two paper plies with PVOH cross-linked with boric acid during paper formation. In other embodiments, both paper cover sheets, the facer cover sheet and the backer cover sheet, are prepared with a multi-ply paper in which at least two paper plies are bonded together with PVOH cross-linked with boric acid during paper formation.

Various technical advantages are achieved by this method, including the improved tensile strength without increasing the weight of a wallboard.

The invention will be now described in more detail by the way of the following non-limiting examples.

Example 1

A multi-ply paper sheet was prepared as follows. A 3% PVOH solution was prepared from the PVOH powder and water. A 3% boric acid solution was prepared with water.

100% DLK (Double Lined Kraft) waste paper was pulped and 1.5 gram handsheets were produced on a 6" British handsheet mold. A handsheet was then sprayed with both PVOH and boric acid solutions in turns to achieve the pick-up rates listed in Table 1.

Another 1.5 gram handsheet was placed onto the treated handsheet immediately after the treatment with PVOH and boric acid. This multi-ply paper sheet was then pressed and dried at 220° F. The multi-ply paper sheet was then conditioned for 16 hours in a room held at 70° F. temperature and 50% relative humidity. A control multi-ply paper sheet was prepared from two handsheets as described above, but the treatment of plies with 3% PVOH/3% boric acid was omitted.

All samples were analyzed for tensile strength, porosity and caliper. The results of these measurements are reported in Table 1. As can be seen from Table 1, bonding plies in a multi-ply paper cover sheet with a non-ionic binder cross-linked with boric acid increases the tensile strength of the paper by up to nearly 20%. This increase in the tensile strength is achieved without a significant increase in paper weight, as the caliper value did not crease significantly between test samples and control. Further, bonding paper plies with a non-ionic binder cross-linked with boric acid do not increase the porous values of dry paper.

TABLE 1

| Sample | Air Dry Weight 2 Ply Handsheets (grams) | Total Solution Pick up PVOH/ Boric Acid (grams) | Total Solids pick up PVOH/ Boric Acid (grams) | PVOH/ Boric Acid (lb/ton) | Tensile Strength (kN/m) | % Increase (Adjusted for weight) | Porosity (seconds) | Caliper mils |
|---|---|---|---|---|---|---|---|---|
| Control | 3.289 | 0.0 | 0.000 | 0.00 | 5.273 | 0.00 | 8.24 | 14.36 |
| A | 3.210 | 4.4 | 0.132 | 82.24 | 5.365 | 4.30 | 7.31 | 13.89 |
| B | 3.268 | 4.6 | 0.138 | 84.40 | 5.501 | 5.06 | 7.51 | 13.89 |
| C | 3.147 | 5.7 | 0.171 | 108.68 | 5.621 | 11.42 | 7.54 | 14.24 |
| D | 3.231 | 8.0 | 0.240 | 148.56 | 6.177 | 19.28 | 7.68 | 13.76 |

What is claimed is:

1. A method of making a wallboard panel, the method comprising:
   forming paper plies from paper pulp;
   spraying one or more of the paper plies with a water-based solution of PVOH (polyvinyl alcohol) binder, wherein a concentration of PVOH in the water-based solution is in the range from 1% to 10% by weight; and
   wherein PVOH has ultra-low degree of polymerization, low degree of polymerization, or a mixture thereof;
   spraying one or more of the paper plies with boric acid solution;
   superimposing paper plies to form a multi-ply paper sheet bonded with the binder;
   pressing and drying the multi-ply paper sheet;
   preparing a gypsum slurry;
   depositing the gypsum slurry between two paper sheets, at least one of which is the multi-ply paper sheet; and
   forming the wallboard panel.

2. The method of claim 1, wherein the multi-ply paper sheet comprises at least one filler ply and at least one liner ply.

3. The method of claim 2, wherein PVOH the plies are any of the following plies: two filler plies, a filler ply and a liner ply, and two liner plies; and wherein spraying with boric acid is also a biocidal treatment and improves resistance of the multi-ply paper sheet against fungal and bacterial growth.

4. The method of claim 1, wherein PVOH is applied to the surface of a first ply, while boric acid is applied to the surface of a second ply, the first ply and the second ply are then superimposed such that the surface treated with PVOH comes in contact with the surface treated with boric acid.

5. The method of claim 1, wherein the paper pulp comprises recycled paper waste.

6. The method of claim 1, wherein the paper pulp comprises recycled paper waste comprising kraft, boxboard cuttings, flyleaf shavings and/or newspaper.

7. The method of claim 1, wherein boric acid is applied as a water-based solution with a concentration in the range from 1% to 10% by weight.

* * * * *

UNITED STATES PATENT AND TRADEMARK OFFICE
CERTIFICATE OF CORRECTION

PATENT NO. : 10,612,194 B2
APPLICATION NO. : 15/607871
DATED : April 7, 2020
INVENTOR(S) : Alfred Li Page 1 of 1

It is certified that error appears in the above-identified patent and that said Letters Patent is hereby corrected as shown below:

In the Claims

Column 8, Line 1, delete "PVOH".

Signed and Sealed this
Eighteenth Day of August, 2020

Andrei Iancu
*Director of the United States Patent and Trademark Office*